United States Patent Office 2,859,587
Patented Nov. 11, 1958

2,859,587
HYPERGOLIC FUEL AND METHOD OF PROPELLING ROCKETS

Cleveland R. Scott, Bartlesville, Okla., and Arnold L. Ayers, Idaho Falls, Idaho, assignors to Phillips Petroleum Company, a corporation of Delaware No Drawing. Application June 8, 1953
Serial No. 360,356

8 Claims. (Cl. 60—35.4)

This invention relates to rocket fuels. In one of its more specific aspects, this invention relates to hypergolic fuels. In another of its more specific aspects, this invention relates to a method for propelling rockets.

Our invention is concerned with new and novel rocket propellants and their utilization. A rocket or jet propulsion device, such as is discussed herein is defined as a rigid container for matter and energy, so arranged that a portion of the matter can absorb the energy in kinetic form and subsequently eject it in a specified direction. The type rocket to which our invention is particularly applied is that type of rocket propulsion device designated as a "pure" rocket, i. e., a thrust producer which does not make use of the surrounding atmosphere. A rocket of the type with which our invention is concerned is propelled in response to the steps of introducing a propellant material into a combustion chamber therein, and burning it under conditions that will cause it to release energy at a high but controllable rate immediately after its entry into the combustion chamber. Rocket propellants in liquid form are advantageously utilized inasmuch as the liquid propellant material can be carried in a light weight, low pressure vessel and thereafter pumped into the combustion chamber. It is thus necessary, that the combustion chamber, although being strong enough to withstand high pressure and temperature, need be only large enough to insure combustion. The flow of liquid propellant into the combustion chamber can be regulated at will so that the thrust resulting from continuous or intermittent bursts of power can be sustained. Intermittent burning of the fuel contributes to a longer life of the combustion chamber and of the thrust nozzle. Various methods and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen. Additional known bipropellants include nitric acid as the oxidizer with aniline or furfuryl alcohol as the hypergolic fuel component.

When employing 90–100 percent nitric acid, i. e., "white fuming nitric acid" as the oxidizer in a rocket bipropellant, it is often necessary, dependent upon the specific fuel component, to obtain more effective ignition than would normally be obtained, by dissolving from 6 to 23 percent by weight of nitrogen dioxide in the white fuming acid, thereby forming "red fuming" nitric acid. A fuel component of the bipropellant-material of the type described herein, is spontaneously ignited upon contacting the oxidizer. For this reason, such as bipropellant-material is referred to herein as being "hypergolic."

The following objects of the invention will be attained by the aspects of this invention.

An object of the invention is to provide new rocket propellants. Another object of the invention is to provide novel hypergolic fuels. Another object of the invention is to provide a method for producing immediate thrust to a rocket type device. Another object of the invention is to provide improved fast burning fuels. Other and further objects will be apparent to those skilled in the art upon study of the accompanying disclosure.

In accordance with the broad aspects of this invention, we have found that tert-butyl mercaptan is suitable for use in propulsion systems wherein hypergolic fuels can be utilized. We have found that tert-butyl mercaptan is hypergolic per se. The fuel constituent of the present invention, i. e., tert-butyl mercaptan, is also hypergolic in a diluted state when admixed with non-hypergolic materials, particularly hydrocarbons, even in a state of dilution ranging as high as 40 percent by volume of hydrocarbon. Suitable non-hypergolic hydrocarbons which can also form a portion of the fuel composition include paraffins, cycloparaffins, olefins, cycloolefins, aromatics and the like in the $C_5$—$C_{35}$ range or mixtures thereof, preferably the normally liquid materials. Examples of such hydrocarbon fuels are n-hexane, n-heptane, benzene, kerosene, di-isobutylene, cyclohexane, isodecane, methylcyclohexane, gasoline, naphtha, diisopropyl, toluene, methylal, hexadecane, eicosane, hexacosane, pentatriacontane, picene, cyclononacosane, tetraphenylethylene, and the like. Hydrocarbons in the $C_5$—$C_{16}$ range are preferred.

In accordance with the present invention, an oxidizer and tert-butyl mercaptan are utilized in a volume ratio of approximately 1:0.7 to 1:15. Preferably at least about 1 volume of mercaptan is employed with each volume of fuming nitric acid or other oxidizer.

Other oxidizers or suitable oxidants for these hypergolic fuels, in addition to white or red fuming nitric acid, can be used in the bipropellant fuel compositions of our invention. Suitable oxidants include materials such as hydrogen peroxide, ozone, nitrogen tetroxide, liquid oxygen, and mixed acids, especially anhydrous mixtures of nitric and sulfuric acids such as 80–90 percent by volume white or red fuming nitric acid in 10–20 percent by volume anhydrous or fuming sulfuric acid.

It is within the scope of this invention to employ, preferably dissolved in the oxidizer, ignition catalysts or oxidation catalysts. These oxidation catalysts include certain metal salts, such as the chlorides and naphthenates of iron, zinc, cobalt and similar heavy materials. As an added feature of this invention, the mercaptan used in this invention is also useful for providing fast burning fuels suitable for use in rocket engines and the like wherein a hypergolic fuel is not necessarily required. For example, the fuel components of this invention are dispersed in a hydrocarbon, such as the hydrocarbon diluents described above. Even if the resulting solution is not hypergolic with an oxidant such as fuming nitric acid, it can be used, together with an oxidant and a suitable igniter, as a rocket propellant. These fast burning fuels are particularly useful, if, for various reasons, a hypergolic fuel is not desired or required. The tert-butyl mercaptan may be added to a hydrocarbon fuel in a minor amount, usually from 1–20 percent by volume, preferably 5–20 percent by volume of the total mixture, to produce fast burning fuels.

The advantages of this invention are illustrated in the following examples. The reactants and their proportions and their specific ingredients are presented as being typical and are not to be construed as being unduly limiting of the invention.

Example I

Tests were conducted wherein 0.13 ml. of tertiary butyl mercaptan was dropped into a 1" x 8" test tube containing varying amounts of fuming nitric acid. Results of these tests are recorded in the following table:

| WFNA, ml. | TBM, ml. | Ignition Results | Ratio, ml. WFNA / ml. TBM | RFNA, ml. | TBM, ml. | Ignition Results | Ratio, ml. RFNA / ml. TBM |
|---|---|---|---|---|---|---|---|
| 0.6 | 0.13 | NI | 4.6 | 0.6 | 0.13 | NI | 4.6 |
| 0.5 | 0.13 | NI | 3.8 | 0.5 | 0.13 | NI | 3.8 |
| 0.4 | 0.13 | NI | 3.1 | 0.4 | 0.13 | NI | 3.1 |
| 0.3 | 0.13 | NI | 2.3 | 0.3 | 0.13 | NI | 2.3 |
| 0.2 | 0.13 | NI | 1.5 | 0.2 | 0.13 | NI | 1.5 |
| 0.15 | 0.13 | Ignition | 1.2 | 0.15 | 0.13 | Ignition | 1.2 |
| 0.1 | 0.13 | ___do___ | 0.8 | 0.1 | 0.13 | ___do___ | 0.8 |
| 0.05 | 0.13 | ___do___ | 0.4 | 0.05 | 0.13 | ___do___ | 0.4 |

These tests demonstrate that approximately equal volumes of acid and fuel are required before spontaneous ignitions will occur consistently. Fuel rich mixtures of tertiary butyl mercaptan and either white fuming nitric acid or red fuming nitric acid are hypergolic. As much as 5.0 ml. of tertiary butyl mercaptan has been ignited in an open tube with as little as 0.3 ml. of either white fuming nitric acid or red fuming nitric acid.

Further tests were conducted wherein varying amounts of tertiary butyl mercaptan were dropped into a 1" x 8" test tube containing 0.3 ml. of fuming nitric acid. Results of these tests are recorded in the following table:

| WFNA, ml. | TBM, ml. | Ignition Results | Ratio, ml. WFNA / ml. TBM | RFNA, ml. | TBM, ml. | Ignition Results | Ratio, ml. RFNA / ml. TBM |
|---|---|---|---|---|---|---|---|
| 0.3 | 0.1 | NI | 3.0 | 0.3 | 0.1 | NI | 3.0 |
| 0.3 | 0.2 | Ignition [1] | 1.5 | 0.3 | 0.2 | Ignition [1] | 1.5 |
| 0.3 | 0.25 | ___do___ | 1.2 | 0.3 | 0.25 | ___do___ | 1.2 |
| 0.3 | 0.3 | ___do___ | 1.0 | 0.3 | 0.3 | ___do___ | 1.0 |
| 0.3 | 0.35 | ___do___ | 0.9 | 0.3 | 0.4 | ___do___ | 0.8 |
| 0.3 | 0.4 | ___do___ | 0.8 | 0.3 | 0.6 | ___do___ | 0.5 |
| 0.3 | 0.5 | ___do___ | 0.6 | | | | |
| 0.3 | 1.0 | ___do___ | 0.3 | | | | |

[1] 2 ignitions out of 4 tests.

These tests also demonstrate that approximately equal volumes of acid and fuel are required before spontaneous ignitions will occur consistently.

Example II

Tests were conducted wherein varying amounts of tertiary butyl mercaptan in admixture with n-heptane were dropped into a 1" x 8" test tube containing 0.3 ml. of fuming nitric acid. Pure grade n-heptane was employed as diluent to determine the maximum amount of dilution which tertiary butyl mercaptan would tolerate and retain its hypergolicity. Results of these tests are recorded in the following table.

| WFNA, ml. | Percent Dilution n-heptane | Vol. of TBM+n-heptane, ml. | Actual vol. TBM, ml. | Ignition Results | Ratio, ml. WFNA / ml. TBM |
|---|---|---|---|---|---|
| 0.3 | 10 | 0.2 | 0.18 | NI | 1.7 |
| 0.3 | 10 | 0.25 | 0.225 | Ignition | 1.3 |
| 0.3 | 10 | 0.3 | 0.27 | ___do___ | 1.1 |
| 0.3 | 20 | 0.25 | 0.2 | NI | 1.5 |
| 0.3 | 20 | 0.3 | 0.24 | Ignition | 1.3 |
| 0.3 | 20 | 0.35 | 0.28 | ___do___ | 1.1 |
| 0.3 | 30 | 0.35 | 0.245 | NI | 1.2 |
| 0.3 | 30 | 0.4 | 0.28 | Ignition | 1.1 |
| 0.3 | 30 | 0.45 | 0.315 | ___do___ | 1.0 |
| 0.3 | 40 | 0.62 | 0.372 | NI | 0.8 |
| 0.3 | 40 | 0.75 | 0.45 | Ignition | 0.7 |
| 0.3 | 40 | 1.0 | 0.6 | ___do___ | 0.5 |

| RFNA, ml. | Percent Dilution n-heptane | Vol. of TBM+n-heptane, ml. | Actual vol. TBM, ml. | Ignition Results | Ratio, ml. RFNA / ml. TBM |
|---|---|---|---|---|---|
| 0.3 | 10 | 0.2 | 0.18 | NI | 1.7 |
| 0.3 | 10 | 0.25 | 0.225 | Ignition | 1.3 |
| 0.3 | 10 | 0.3 | 0.27 | ___do___ | 1.1 |
| 0.3 | 20 | 0.25 | 0.2 | NI | 1.5 |
| 0.3 | 20 | 0.3 | 0.24 | NI | 1.3 |
| 0.3 | 20 | 0.35 | 0.28 | Ignition | 1.1 |
| 0.3 | 30 | 0.35 | 0.245 | NI | 1.2 |
| 0.3 | 30 | 0.4 | 0.28 | NI | 1.1 |
| 0.3 | 30 | 0.45 | 0.315 | Ignition | 1.0 |
| 0.3 | 40 | 0.62 | 0.372 | NI | 0.8 |
| 0.3 | 40 | 0.75 | 0.45 | Ignition | 0.7 |
| 0.3 | 40 | 1.0 | 0.6 | ___do___ | 0.5 |

These results demonstrate that tertiary butyl mercaptan retains its self-ignition properties when fuming nitric acids are used as oxidants in dilutions ranging as high as 40 volume percent of hydrocarbon diluent.

As will be evident to those skilled in the art, various modifications of this invention can be made or followed in the light of this disclosure without departing from the spirit and the scope of this invention.

We claim:

1. A fuel which is hypergolic with an oxidizer comprising at least 60 percent by volume of tert-butyl mercaptan and up to 40 percent by volume of a normally liquid hydrocarbon in the $C_5$ to $C_{35}$ range.

2. A fuel which is hypergolic with an oxidizer comprising at least 60 percent by volume of tert-butyl mercaptan and up to 40 percent by volume of a normally liquid hydrocarbon in the $C_5$ to $C_{16}$ range.

3. A fuel comprising normally liquid hydrocarbons in the $C_5$ to $C_{35}$ range and from 1 to 20 percent by volume of tert-butyl mercaptan.

4. A fuel comprising normally liquid hydrocarbons in the $C_5$ to $C_{35}$ range and from 5 to 20 percent by volume of tert-butyl mercaptan.

5. A method for applying immediate thrust to a mass comprising introducing separate streams of an oxidant and fuel component of a bipropellant into contact with each other in a combustion chamber of a reaction motor in such proportions as to produce spontaneous ignition, said fuel component consisting essentially of tert-butyl mercaptan and the ratio of said oxidizer of tert-butyl mercaptan being not more than 1:0.7.

6. A method for applying immediate thrust to a mass comprising introducing separate streams of an oxidant and fuel component of a bipropellant into contact with each other in a combustion chamber of a reaction motor in such proportions as to produce spontaneous ignition, said fuel component consisting essentially of tert-butyl mercaptan and the ratio of said oxidizer to tert-butyl mercaptan being in the range of 1:0.7 to 1:15.

7. A method for applying immediate thrust to a mass comprising introducing separate streams of an oxidant and fuel components of a bipropellant into contact with each other in a combustion chamber of a reaction motor in such proportions as to produce spontaneous ignition, said fuel consisting essentially of tert-butyl mercaptan and said oxidizer being selected from the group consisting of white fuming nitric acid, red fuming nitric acid, hydrogen peroxide, ozone, nitrogen tetroxide, liquid oxygen, and a mixture of at least 80 percent by volume fuming nitric acid and up to 20 percent by volume fuming sulfuric acid, and a ratio of said oxidizer to tert-butyl mercaptan being in the range of 1:0.7 to 1:15.

8. A method for applying immediate thrust to a mass comprising introducing separate streams of an oxidant and fuel components of a bipropellant into contact with each other in a combustion chamber of a reaction motor in such proportions as to produce spontaneous ignition, said fuel components comprising at least 60 percent by volume of tert-butyl mercaptan and up to 40 percent by volume of normally liquid hydrocarbons, said oxidant being selected from the group consisting of white fuming nitric acid, red fuming nitric acid, hydrogen peroxide, ozone, nitrogen tetroxide, liquid oxygen, and a mixture of at least 80 percent by volume fuming nitric acid and up to 20 percent by volume fuming sulfuric acid, and the ratio of said oxidizer to said tert-butyl mercaptan being in the range of from 1:0.7 to 1:15.

References Cited in the file of this patent

UNITED STATES PATENTS

| | | |
|---|---|---|
| 2,489,051 | Sayward et al. | Nov. 22, 1949 |
| 2,557,018 | Viles | June 12, 1951 |

UNITED STATES PATENT OFFICE
CERTIFICATE OF CORRECTION

November 11, 1958

Patent No. 2,859,587

Cleveland R. Scott et al.

It is hereby certified that error appears in the printed specification of the above numbered patent requiring correction and that the said Letters Patent should read as corrected below.

Column 4, line 52, for "of", second occurrence, read -- to --.

Signed and sealed this 22nd day of September 1959.

(SEAL)
Attest:

KARL H. AXLINE
Attesting Officer

ROBERT C. WATSON
Commissioner of Patents